Aug. 13, 1957 G. A. DAVIS 2,802,483
HYDRAULICALLY-OPERATED GATE VALVES
Filed March 1, 1956 3 Sheets-Sheet 1

INVENTOR
GEORGE A. DAVIS
BY
ATTORNEY

2,802,483

HYDRAULICALLY-OPERATED GATE VALVES

George A. Davis, Mountain Lakes, N. J., assignor to Allied Chemical & Dye Corporation, New York, N. Y., a corporation of New York Application March 1, 1956, Serial No. 568,827

5 Claims. (Cl. 137—553)

This invention relates to valves and more particularly refers to a new and improved hydraulically operated gate valve.

An object of the present invention is to provide a fluid pressure actuated gate valve which is simple in construction, rugged in operation and which may be readily operated in the event of a power failure.

Another object of the present invention is to provide in combination with the gate valve a system for registering on a dial the open, closed, and intermediate positions of the gate valve.

A further object of the present invention is to provide a locking mechanism for retaining the hydraulic valve in open position.

A still further object of the present invention is to provide light switches for indicating when the valve is in fully open or closed position.

Another object of the present invention is to provide a brake system for automatically locking the valve in any position and retaining the valve in locked position until automatically released by fluid pressure means to actuate the valve.

Other objects and advantages will be apparent from the following description and accompanying drawing.

Figure 1:
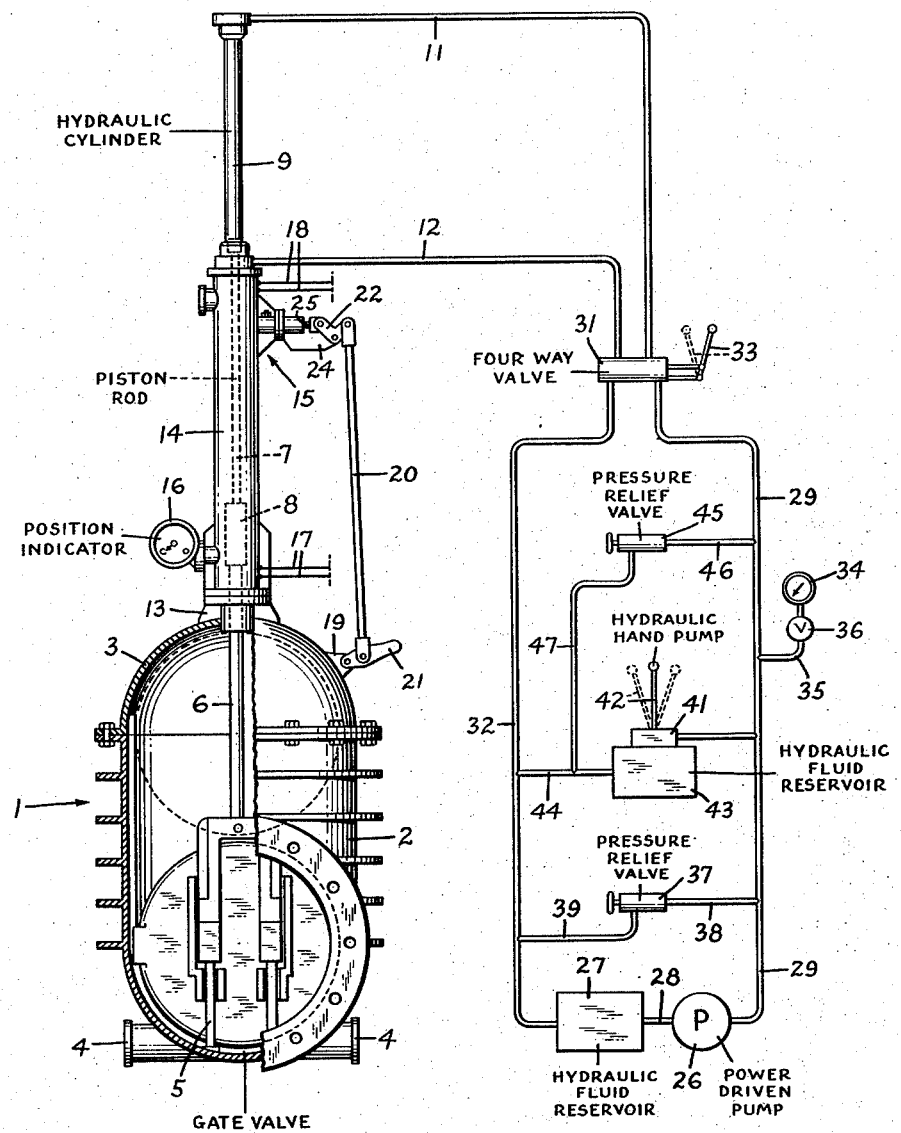
Figure 1 is an elevation in partial section of the gate valve together with a diagrammatic illustration of fluid pressure control means for actuating the gate valve.

Referring to Figure 1, the illustrated valve is a typical gate valve 1 engaged by a valve body 2, a valve dome 3 and provided, if desired, with clean-out ports 4. In the drawing as illustrated is a double gate 5 from which extends valve stem 6. Reciprocal movement of the valve stem causes the gate to move in open or closed position or partially open position as is conventional in the operation of such gate valves. Valve stem 6 is connected to piston rod 7 shown in dotted lines by means of coupling 8. Piston rod 7 extends up into the usual hydraulic cylinder 9 wherein it is attached to movable piston, not shown in the drawing, which is actuated by the introduction of fluid through line 11 or 12 depending upon the direction of the movement desired.

Mounted on valve dome 3 is stuffing box and bearing 13 through which passes valve stem 6. Above stuffing box 13 surrounding the upper portion of valve stem 6, coupling 8 and the lower part of piston rod 7, is casing or extension 14 which houses the position indicator mechanism and part of the spring lock designated by numeral 15. As shown in the drawing, dial 16 for marking the position of the valve is attached to casing 14. Near the bottom of housing 14 are lead wires 17 for signalling when the valve is fully closed, and near the top of housing 14 are lead wires 18 for signalling when the valve is fully opened. On valve dome 3 is ear 19 to which is pivotally connected lock operating lever 21 adapted to be manually pushed downwardly thereby pulling attached connecting rod 20 downwardly which in turn moves toggle 22 pivotally mounted on bracket 24 causing spring loaded plunger 25 to recede and release the valve from locking position to permit it to move in closed position.

Assuming the valve to be fully opened and it is desired to close the valve, then power driven pump 26 would withdraw fluid which may be oil, water or any other suitable liquid from hydraulic fluid reservoir 27 through suction line 28 and force the fluid through line 29 through a four-way valve 31 thence through line 11 into the top of hydraulic cylinder 9 causing the piston therein to move downwardly and transmitting its motion down through piston rod 7, coupling 8, valve stem 6 and gate 5. Hydraulic fluid compressed by the downward movement of the piston in hydraulic cylinder 9 discharges through line 12, valve 31, line 32 into hydraulic fluid reservoir 27. Dial 16 indicates to what extent the valve is open and in addition coupling 8 closes a light switch shown in Figure 2, signalling that the valve is completely closed. Four-way slide valve 31 may be manually manipulated by means of handle 33 for plugging off the flow of fluid through lines 11 and 12, or for causing the fluid under pressure to flow through line 12 into hydraulic cylinder 9 and discharge from the top of hydraulic cylinder 9 through line 11 for the purpose of causing reverse movement of the valve, i. e. opening of the valve. Hydraulic pressure on the system is recorded on gauge 34 connected to high pressure line 29 by means of line 35 and valve 36. Pressure relief valve 37 is interposed between lines 29 and 32 by means of lines 38 and 39, and, in the event the pressure builds up to an unsafe value, the valve will release and relieve the excess pressure. As a precautionary measure, in the event of power failure or mechanical defect, the hydraulic system is provided with a hydraulic hand pump 41 manually operated by handle 42 which draws hydraulic fluid from hydraulic fluid reservoir 43 and sends it under pressure via lines 29 and 11 into hydraulic cylinder 9 previously described in the manner similar to when operating pump 41. Fluid discharges from hydraulic cylinder 9 through lines 12, 32 and 44 into reservoir 43. Interposed between lines 29 and 44 is another pressure relief valve 45 connected by lines 46 and 47.

Figure 2:
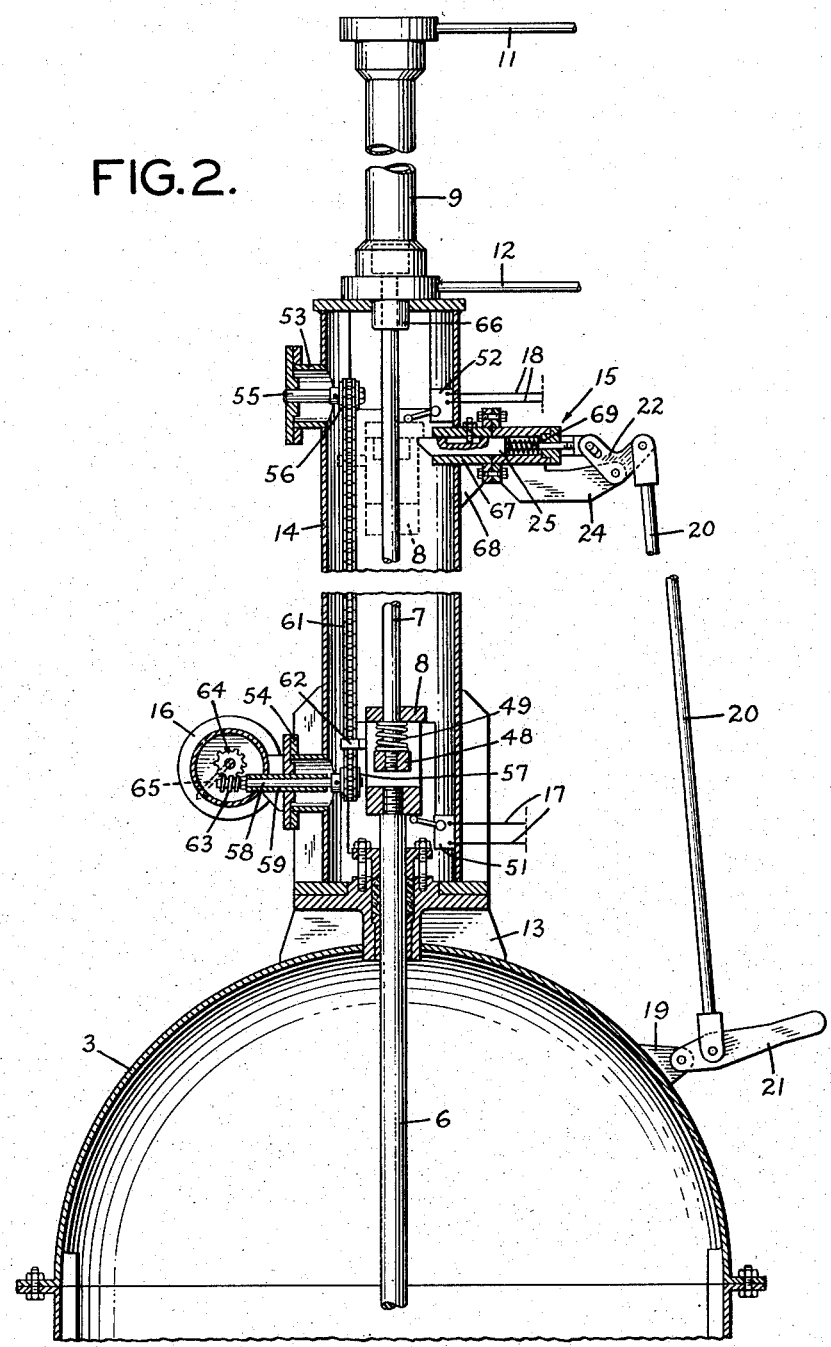
Figure 2 is an enlarged section showing in detail the structure of the position indicator and the structure of the locking mechanism.

In Figure 2 is seen valve dome 3 on top of which is mounted stuffing box and bearing 13 with valve stem 6 extending up through dome 3 and stuffing box 13 and engaging coupling 8. Piston rod 7 passes down through coupling 8 and is retained in position by means of nut 48. Interposed between nut 48 and the top of coupling 8 is coil spring 49 to provide some play in the movement of the piston and aid in opening the valve. Coupling 8 in solid lines is shown in position when the valve is almost closed. As is seen from the drawing, the bottom side of coupling 48 when near closed position closes a light switch 51 to which are connected lead wires 17 which in turn are connected to a light signal. Similarly the top of coupling 8 is shown in dotted lines and when the valve is almost in completely open position closes light switch 52 from which extends lead wires 18 which are connected to a signal light.

Surrounding piston rod 7 and coupling 8 and valve stem 6 is casing 14 provided with a side extension 53 near the top and a side extension 54 near the bottom. Mounted in side extension 53 is idler shaft 55 and sprocket 56. Sprocket 57 is mounted on shaft 58 which passes through bearing 59 fixed in side extension 54. Endless chain 61 passes around and engages the teeth of sprockets 56 and 57. Fixed to coupling 8 is lug 62 which engages chain 61 causing the chain to move upwardly and downwardly corresponding to the movement of coupling 8. Shaft 58 terminates in worm drive 63 which engages worm gear 64. Opening or closing of the valve actuated by fluid pressure in hydraulic cylinder 9 moves piston rod 7 which motion in turn is transmitted to coupling 8, lug 62, and chain 61 causing rotation of sprocket wheel 57, shaft 58 and worm drive 63, thereby rotating worm gear 64 and attached hand 65 which indicates the extent of opening and closing of the valve by face markings on position indicator 16. Piston rod 7 extends through the top of casing 14 through stuffing box 66 and connects to a piston in hydraulic cylinder 9 provided with fluid conduits 11 and 12.

The spring lock mechanism 15 for maintaining the valve in open position is constructed of a housing 67 extending through casing 14 and supported by bracket 68. A plunger 25 engages the underside of an abutment near the top of coupling 8 shown in dotted lines. The plunger is normally urged forward in closed position by means of spring 69. A toggle 22 is pivotally mounted on bracket 24 and at one point engages plunger 25 and at another is connected to connecting rod 20. The other end of connecting rod 20 is fastened to manually operated lock operating lever 21 pivotally mounted on ear 19. When it is desired to release lock mechanism 15 to permit the valve to move in closed position, the operator manually moves lever 21 downwardly which motion causes withdrawal of plunger 25 and permits coupling 8 to freely move downwardly.

Figure 3:
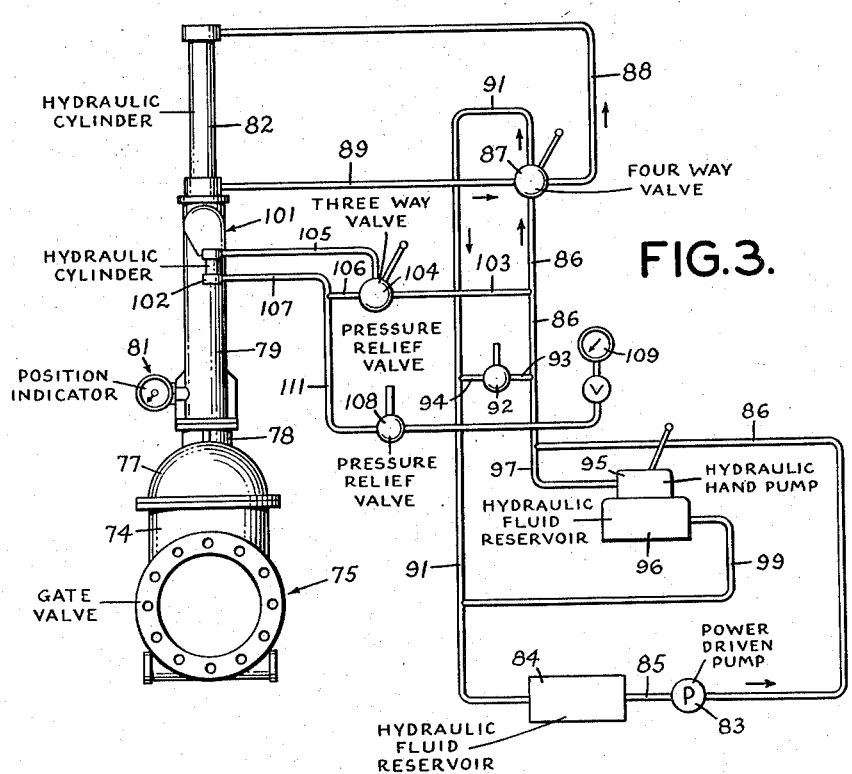
Figure 3 is a diagrammatic illustration of the valve and hydraulic system for actuating the valve and for releasing the automatic brake mechanism which normally holds the valve locked in any position.

Figure 3 is a hydraulically operated gate valve which is equipped with a brake system for normally maintaining the valve locked in any position and for automatically releasing the brake upon application of fluid pressure for actuating the valve. The gate valve proper, designated by numeral 75, may be similar to the gate valve shown in Figure 1 or any other conventional gate valve and comprises the usual valve body 74, valve dome 77 and stuffing box 78. Above the stuffing box 78 is casing 79 surrounding chain and sprocket mechanism as illustrated in Figure 2 for indicating the position of the valve on dial 81. Above casing 79 is hydraulic cylinder 82 containing a piston which may be reciprocated by the introduction of fluid under pressure and which in turn is connected to a piston rod which transmits its motion to the valve stem connected to the valve gate causing the latter to open and close in accordance with the movement of the piston. The hydraulic system for actuating the piston in cylinder 82 is similar to that described in connection with Figure 1 and involves a power driven pump 83 which withdraws hydraulic fluid from reservoir 84 through suction line 85 and sends the fluid under pressure through line 86, thence through four-way valve 87, through line 88, into the top of hydraulic cylinder 82, forcing the piston therein downwardly to cause closing of the valve. Fluid compressed by the piston in cylinder 82 discharges through line 89, valve 87, line 91, returning to hydraulic fluid reservoir 84. Pressure relief valve 92, connected to lines 86 and 91 by lines 93 and 94, is provided for the release of excess pressure. In case of failure of power or other emergency manually operated pump 95 mounted on hydraulic fluid reservoir 96 may be employed to force fluid under pressure through lines 97, 86, valve 87 and line 88 into cylinder 82. Fluid discharging from hydraulic cylinder 82 flows through lines 89, valve 87, lines 91, and 99 into reservoir 96. Four-way valve 87 may be manipulated to reverse the flow of fluid, i. e. direct fluid under pressure through line 89 into hydraulic cylinder 82 and out through line 88.

Mounted on casing 79 is a brake mechanism designated by the numeral 101, as will be more fully described in connection with Figures 4 and 5, which brake normally holds the valve in locked position. Operatively connected to the brake mechanism is hydraulic cylinder 102 which is set to operate at a lower pressure than hydraulic cylinder 82 and which when actuated causes release of brake 101 to permit movement of the valve. For illustrative purposes, assume that valve 75 is in a static condition and it is desired to move the valve gate. Power driven pump 83 or manually operated hydraulic pump 95 is started for the purpose of sending fluid under pressure through line 86, valve 87, line 89 into hydraulic cylinder 82 and also through line 103, valve 104 and line 105 into hydraulic cylinder 102. The fluid pressure in lines 86, 89, 103 and 105 gradually builds up due to the operation of the pump. When the pressure reaches, say for example, 50 pounds per square inch, the fluid has sufficient force to move the piston in hydraulic cylinder 102 and release the brake but the fluid pressure is insufficient to cause upward movement of the cylinder in hydraulic cylinder 82 which requires a considerably higher pressure, say for example, 400 pounds per square inch. Consequently, brake 101 is released by means of hydraulic cylinder 102 before any movement of the piston in hydraulic cylinder 82 occurs. Continuing operation of the pump increases the fluid pressure to say 400 pounds, sufficient to move the piston upwardly in hydraulic cylinder 82, and also maintains a high fluid pressure in line 105 to retain brake 101 in open position. Thus it will be evident that the operation of the hydraulic system for moving the gate valves also automatically and preliminarily releases brake 101. Brake 101 may be locked again simply by turning valve 104 and diverting the fluid under pressure through line 105. A pressure relief valve 108 and pressure indicating gauge 109 are provided in line 111.

Figure 4:
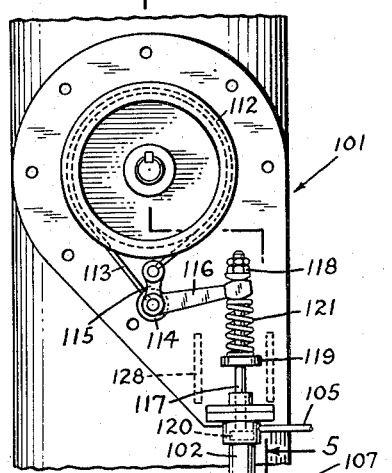
Figure 4 is an enlarged section of the brake mechanism for locking the valve in any position.

In Figure 4, brake mechanism 101 is constructed of brake drum 112 around which is wound brake band 113. One end of brake band 113 is attached to pivot 114 and the other end of brake band 113 is attached to one end of rotatable arm 115 which is mounted on pivot 114. Brake arm 116 is also mounted on pivot 114 in such manner that rotation of brake arm 116 causes rotation of rotatable arm 115 with consequent tightening or loosening of the brake band 113 around brake drum 112. Piston rod 117 of hydraulic cylinder 102 passes loosely through a hole in the end of brake arm 116 and the arm is held in place by means of nut 118 screwed onto the end of the piston rod. Interposed beneath brake arm 116 and above fixed platform bar 119, through which piston rod 117 also passes, is compression spring 121 which urges brake arm 116 upwardly thereby keeping brake band 113 taut around brake drum 112 in normally locked position. Spring 121 is set for relatively low force equivalent to pressure in cylinder 102 of the order of 25–75 pounds per square inch as compared to the force equivalent to a pressure of the order of 200 to 600 pounds per square inch required for moving the valve-loaded piston in hydraulic cylinder 82. Beneath fixed platform 119 is hydraulic cylinder 102 and hydraulic fluid lines 105 and 107. Upon starting power driven pump 83 hydraulic fluid under pressure flows through line 105 into hydraulic cylinder 102 and when the hydraulic pressure increases to a pressure sufficient to overcome the resistance of compression spring 121, say about 50 pounds, piston 120 shown in dotted lines in hydraulic cylinder 102 moves downwardly thereby moving brake arm 116 and relieving the tension of brake band 113 on brake drum 112 permitting it to freely rotate. Release of fluid pressure on hydraulic cylinder 102 causes compression spring 121 to become the dominating force moving brake arm 116 upwardly and tightening brake band 113 around brake drum 112 thereby locking it in position. If desired, only one of the illustrated passages, namely passage 105, need be used as a pressure passage, because the spring 121 will function as a return spring, and the other passage 107 may be permanently open as a vent.

Figure 5:
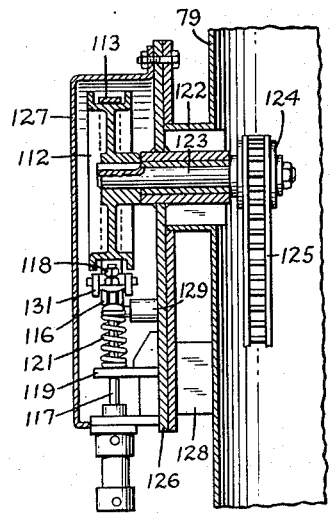
Figure 5 is a section of the brake mechanism taken along line 5—5 of Figure 4.

In Figure 5 is shown a method for mounting the brake mechanism and combining it with position indicator mechanism in compact simple efficient structure. Casing 79 has a side expansion 122 (the same as side expansion 53 in Figure 2) through which extends idler shaft 123 (corresponding to shaft 55 of Figure 2) on which is mounted sprocket 124 and chain 125 (corresponding to sprocket 56 and chain 62 of Figure 2). In short, the indicating mechanism and structure of Figures 3 and 5 is similar to that of Figures 1 and 2. However, idler shaft 123 is also employed for mounting to brake drum 112. Brake band 113 is seen in section around brake drum 112. Below brake drum is nut 118, brake arm 116, compreession spring 121 and fixed platform 119. This structure is supported by mounting flange 126 and encased by shield 127. Plates 128 welded to casing 79 and flange 126 give additional rigidity and strength to the structure. A bar 129 welded to mounted flange 126 is provided to prevent downward over travel of piston rod 117 by engaging a projection 131 secured near the top of piston rod 117. Chain 125 is joined to the valve stem and piston rod by a lug not shown in Figure 5 but illustrated in Figure 2 as lug 62 on coupling 8.

Although certain preferred embodiments of the invention have been disclosed for purpose of illustration it will be evident that various changes and modifications may be made therein without departing from the scope and spirit of the invention.

I claim:

1. A hydraulically operated gate valve comprising in combination a valve body having a dome thereon, a gate movably mounted in the valve body, a valve stem connected to the gate and extending through the dome, one end of a piston rod connected to the valve stem and the other end of the piston rod extending into and connected to a piston in a hydraulic cylinder, openings in the hydraulic cylinder for the introduction and release of fluid on either side of the piston to move the piston in either direction in the hydraulic cylinder and consequently reciprocal motion of the attached piston rod and valve stem and gate thereby effecting opening and closing of the valve, a casing between the top of the dome and the bottom of the hydraulic cylinder surrounding the valve stem and piston rod, two side extensions in the casing with one side extension near the top of the casing and the other side extension near the bottom of the casing, a shaft and sprocket mounted in one side extension, a shaft and sprocket mounted in the other side extension, an endless chain passing around and engaging the teeth of the two sprockets, connecting means between the valve stem-piston rod surrounded by the casing and the endless chain thereby effecting movement of the chain to correspond with the reciprocal movement of the valve stem-piston rod during opening and closing of the valve, said chain also during movement rotating one of the shafts on which the sprocket is affixed, a dial outside of said casing adjacent the end of the rotating shaft which extends through the casing, a hand on said dial connected to the rotating shaft by means adapted to rotate said dial and markings on the dial to indicate the extent of opening and closing of the valve corresponding to the reciprocal motion of the valve stem-piston rod.

2. A hydraulically operated gate valve comprising in combination a valve body having a dome thereon, a gate movably mounted in the valve body, a valve stem connected to the gate and extending through the dome, one end of a piston rod connected to the valve stem by means of a coupling and the other end of the piston rod extending into and connected to a piston in a hydraulic cylinder, openings in the hydraulic cylinder on either side of the piston to move the piston in either direction in the hydraulic cylinder and consequently reciprocal motion of the attached piston rod and valve stem and gate thereby effecting opening and closing of the valve, a casing between the top of the dome and the bottom of the hydraulic cylinder surrounding the valve stem and piston rod, two side extensions in the casing with one side extension near the top of the casing and the other side extension near the bottom of the casing, a shaft and sprocket mounted in one side extension, a rotatable shaft and sprocket mounted in the other side extension, an endless chain passing around and engaging the teeth of the two sprockets, a lug attached to and extending from the coupling and engaging the endless chain thereby effecting movement of the chain to correspond with the reciprocal movement of the valve stem-piston rod during opening and closing of the valve, said chain also during movement rotating one of the shafts on which the sprocket is affixed, a dial outside of said casing adjacent the end of the rotating shaft which extends through the casing, a hand on said dial connected to the rotating shaft by means adapted to rotate said dial and markings on the dial to indicate the extent of opening and closing of the valve corresponding to the reciprocal motion of the valve stem-piston rod, another opening near the top of the casing in which is mounted a plunger and a spring which normally urges the plunger inwardly toward the center of the casing, an abutment extending from the coupling, the under side of which is engaged by the plunger when the valve is in fully open position thereby maintaining the valve locked in open position, a manually operated lever connected to the plunger to withdraw the plunger from under the abutment thereby releasing the valve from locked open position to permit it to be closed.

3. A hydraulically operated gate valve comprising in combination a valve body having a dome thereon, a gate movably mounted in the valve body, a valve stem connected to the gate and extending into and connected to a piston in a hydraulic cylinder, openings in the hydraulic cylinder for the introduction and release of fluid on either side of the piston to move the piston in either direction in the hydraulic cylinder and consequently reciprocal motion of the attached piston rod and valve stem and gate thereby effecting opening and closing of the valve, a casing between the top of the dome and the bottom of the hydraulic cylinder surrounding the valve stem and piston rod, two side extensions in the casing with one side extension near the top of the casing and the other side extension near the bottom of the casing, a rotatable shaft and sprocket mounted in one side extension, a rotatable shaft and sprocket mounted in the other side extension, an endless chain passing around and engaging the teeth of the two sprockets, connecting means between the valve stem-piston rod surrounded by the casing and the endless chain thereby effecting movement of the chain to correspond with the reciprocal movement of the valve stem-piston rod during opening and closing of the valve, said chain also during movement rotating both of the shafts on which the sprockets are affixed, a dial outside of said casing adjacent the end of one of the rotating shafts which extends through the casing, a hand on said dial connected to said rotating shaft by means adapted to rotate said dial, markings on the dial to indicate the extent of opening and closing of the valve corresponding to the reciprocal motion of the valve stem piston rod, a brake drum mounted on the other rotatable shaft, a brake band around the brake drum, a brake arm for tightening or loosening the brake band around the brake drum, a spring for normally maintaining the brake band tight around the brake drum thereby preventing rotation of the shaft on which the brake drum is mounted and which in turn locks the valve, said spring being set at a relatively low compression as compared to the pressure required to move the piston in the hydraulic cylinder for opening and closing the gate, a piston rod connected at one end to the brake arm and the other end to a piston rod extending into and connected to a piston in a second hydraulic cylinder, openings in the second hydraulic cylinder for the introduction and release of fluid under pressure on either side of the piston to move the piston and consequently the connected piston rod and brake arm thereby loosening the brake band around the brake drum and permitting the valve to be opened or closed, a pump for directing hydraulic fluid under pressure through fluid pressure lines connecting the pump with the openings in the first and second hydraulic cylinders.

4. A hydraulically operated gate valve comprising in combination a valve body having a dome thereon, a gate movably mounted in the valve body, a valve stem connected to the gate and extending through the dome, one end of a piston rod connected to the valve stem by means of a coupling and the other end of the piston rod extending into and connected to a piston in a hydraulic cylinder, openings in the hydraulic cylinder on either side of the piston to move the piston in either direction in the hydraulic cylinder and consequently reciprocal motion of the attached piston rod and valve stem and gate thereby effecting opening and closing of the valve, a casing between the top of the dome and the bottom of the hydraulic cylinder surrounding the valve stem and piston rod, two side extensions in the casing with one side extension near the top of the casing and the other side extension near the bottom of the casing, a shaft and sprocket mounted in one side extension, a shaft and sprocket mounted in the other side extension, an endless chain passing around and engaging the teeth of the two sprockets, a lug attached to and extending from the coupling and engaging the endless chain thereby effecting movement of the chain to correspond with the reciprocal movement of the valve stem-piston rod during opening and closing of the valve, said chain also during movement rotating one of the shafts on which the sprocket is affixed, a brake drum mounted on the rotatable shaft, a brake band around the brake drum, a brake arm for tightening or loosening the brake band around the brake drum, a spring for normally maintaining the brake band tight around the brake drum thereby preventing rotation of the shaft on which the brake drum is mounted and which in turn locks the valve, said spring being set at a relatively low compression as compared to the pressure required to move the piston in the hydraulic cylinder for opening and closing the gate, a piston rod connected at one end to the brake arm and the other end of the piston rod extending into and connected to a piston in a second hydraulic cylinder, openings in the second hydraulic cylinder for the introduction and release of fluid under pressure on either side of the piston to move the piston and consequently the connected piston rod and brake arm thereby loosening the brake band around the brake drum and permitting the valve to be opened or closed, a pump for directing hydraulic fluid under pressure through fluid pressure means connecting the pump with the openings in the first and second hydraulic cylinders, a light switch disposed inside and near the top of the casing adapted to be closed by contact with the coupling in its upward movement through the casing thereby indicating that the valve is fully open and a light switch disposed inside and near the bottom of the casing adapted to be closed by contact with the coupling during its downward reciprocal movement thereby indicating that the valve is fully closed.

5. A hydraulically operated gate valve comprising, in combination, a valve stem, a brake drum, a linkage connecting said drum and stem adapted to effect rotation of the former upon axial movement of the latter, a double acting piston and cylinder disposed on said stem adapted upon application of predetermined hydraulic pressure upon said piston to move the same and said stem axially in either direction, a hydraulic system including a pump, a directional valve, and connecting lines adapted to supply hydraulic fluid at said pressure selectively to either side of said piston, an assembly comprising a brake shoe disposed and arranged to engage said drum, a hydraulic cylinder and piston, and a linkage therebetween, which assembly is adapted upon application to the piston thereof of hydraulic pressure lower than the aforesaid predetermined hydraulic pressure to actuate said shoe, and a hydraulic line operatively connecting said assembly and said hydraulic system.

No references cited.